(12) United States Patent
Krishnan et al.

(10) Patent No.: US 10,155,436 B2
(45) Date of Patent: Dec. 18, 2018

(54) MOTOR VEHICLE DOOR ASSEMBLY WITH WATER MANAGEMENT FEATURE ON WINDOW SUBASSEMBLY

(71) Applicant: FORD GLOBAL TECHNOLOGIES, LLC, Dearborn, MI (US)

(72) Inventors: Venkatesh Krishnan, Canton, MI (US); Bhupendra A. Patel, Canton, MI (US); Livianu Dorin Puscas, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/343,973

(22) Filed: Nov. 4, 2016

(65) Prior Publication Data

US 2018/0126834 A1 May 10, 2018

(51) Int. Cl.
*B60J 10/25* (2016.01)
*B60J 5/04* (2006.01)

(52) U.S. Cl.
CPC .............. *B60J 10/25* (2016.02); *B60J 5/04* (2013.01); *B60J 5/0418* (2013.01)

(58) Field of Classification Search
CPC ....................................................... B60J 10/25
See application file for complete search history.

(56) References Cited

U.S. PATENT DOCUMENTS

| | | | | |
|---|---|---|---|---|
| 2,672,365 A | * | 3/1954 | Stanton | B60J 1/14 296/154 |
| 2,747,922 A | * | 5/1956 | Gibson | B60R 13/07 137/855 |
| 3,583,757 A | * | 6/1971 | Wilfert | B60R 13/07 296/154 |
| 3,701,560 A | | 10/1972 | Emmerson et al. | |
| 4,962,601 A | * | 10/1990 | Gold | B60J 10/25 296/154 |
| 5,791,088 A | * | 8/1998 | Martinelli | B60J 1/16 49/375 |
| 6,334,646 B1 | * | 1/2002 | Oami | B60R 13/07 296/213 |
| 6,430,878 B2 | | 8/2002 | Terasawa et al. | |
| 7,784,851 B2 | | 8/2010 | Filipczak et al. | |
| 7,861,464 B2 | | 1/2011 | Bisnack | |

(Continued)

FOREIGN PATENT DOCUMENTS

CN 204340917 U 5/2015
EP 1930194 B1 2/2012

(Continued)

OTHER PUBLICATIONS

English Machine Translation of CN204340917U.

*Primary Examiner* — Catherine A Kelly
(74) *Attorney, Agent, or Firm* — Jason Rogers; King & Schickli, PLLC

(57) ABSTRACT

A motor vehicle door assembly includes a door having an internal compartment and a door latch mechanism within that internal compartment. The motor vehicle door assembly also includes a window subassembly. That window subassembly includes a window body and water management feature carried on the window body whereby water is diverted from the door latch mechanism. A related method of diverting water from a door latch mechanism in a motor vehicle door assembly is also disclosed.

6 Claims, 4 Drawing Sheets

(56) References Cited

U.S. PATENT DOCUMENTS 8,312,689 B2 * 11/2012 Terazawa ................ B60J 10/78
296/146.15
2007/0294951 A1 * 12/2007 Tenorio ................ E05F 11/382
49/375

FOREIGN PATENT DOCUMENTS

FR         2583359 A1 * 12/1986  ............... B60J 1/17
FR         2921018 A1   3/2009  ............ B60R 13/07

* cited by examiner

MOTOR VEHICLE DOOR ASSEMBLY WITH WATER MANAGEMENT FEATURE ON WINDOW SUBASSEMBLY

TECHNICAL FIELD

This document relates generally to the motor vehicle equipment field and, more particularly, to a motor vehicle door assembly that incorporates a water management feature on the window subassembly. That water management feature protects the door latch mechanism, including latches and actuating levers as well as window regulators, motors, electronic modules and other electronics from water which could freeze during inclement winter weather conditions.

BACKGROUND

Motor vehicle door assemblies incorporate side door glass mechanisms or window subassemblies that include a window body that is displaceable between (a) a raised and closed position and (b) a lowered and opened position. More specifically, the window body of the window subassembly extends through a slot formed between the door outer and door inner panels.

While a seal is provided between the window body and the door inner and outer panels at the slot opening, water still has a tendency to enter the internal compartment of the door between the door outer and door inner panels. This document relates to a new and improved motor vehicle door assembly wherein the window subassembly includes a water management feature that is carried on the window body. That water management feature functions to divert water that enters the internal compartment away from the door latch mechanism and thereby prevents the door latch mechanism from freezing in winter weather conditions.

SUMMARY

In accordance with the purposes and benefits described herein, a motor vehicle door assembly is provided. That motor vehicle door assembly comprises a door having an internal compartment, a door latch mechanism within the internal compartment and a window subassembly. That window subassembly includes a window body and a water management feature carried on the window body whereby water is diverted from the door latch mechanism.

That water management feature may include an elongated strip having a water drain channel and at least one water drain hole in the water drain channel whereby water is collected and diverted away from the door latch mechanism.

The elongated strip is provided so as to extend along the bottom edge of the window body. Further, the elongated strip may include a flange forming at least a portion of the water drain channel. In addition, the elongated strip may include a receiver engaging and holding the bottom edge of the window body. In one or more of the many possible embodiments, the flange may extend from the receiver. Further, a living hinge may be provided at a base of the flange. Such a living hinge feature allows the flange to bend and, therefore, the water drain channel to flex and move around components or obstructions within the motor vehicle door assembly that would otherwise interfere in the path of movement of the water management feature as the window body is displaced up and down between (a) the raised and closed position and (b) the lowered and opened position.

Still further, the window subassembly may also include a window bracket connecting the window body to a window regulator whereby the window body is displaced between (a) the raised and closed position and (b) the lowered and opened position. That window bracket may include a water passageway that is provided in communication with the water drain channel so that water collected in the water drain channel may flow along the water drain channel through the water passageway in the window bracket toward the at least one water drain hole.

In accordance with an additional aspect, a method is provided of diverting water from a door latch mechanism in a motor vehicle door. That method comprises the steps of collecting water in a water management feature carried on a window body in the motor vehicle door and draining that water from the water management feature at a location remote from the door latch mechanism within the door.

The method may further include the step of directing the water along a water drain channel along a bottom edge of the window body to a water drain hole. Still further, the method may include the step of directing the water through a water passageway in a window bracket that is in communication with the water drain channel.

The method may also include the step of forming the water drain channel from a flange having a living hinge whereby the water drain channel will flex around any component or obstruction in the path of the water drain channel as the window body is displaced between (a) the raised and closed position and (b) the lowered and opened position.

In the following description, there are shown and described several preferred embodiments of the motor vehicle door assembly and the related method of diverting water from a door latch mechanism in a motor vehicle door. As it should be realized, the motor vehicle door assembly and related method are capable of other, different embodiments and their several details are capable of modification in various, obvious aspects all without departing from the motor vehicle door assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the motor vehicle door assembly and the related method and together with the description serve to explain certain principles thereof.

Figure 4A:
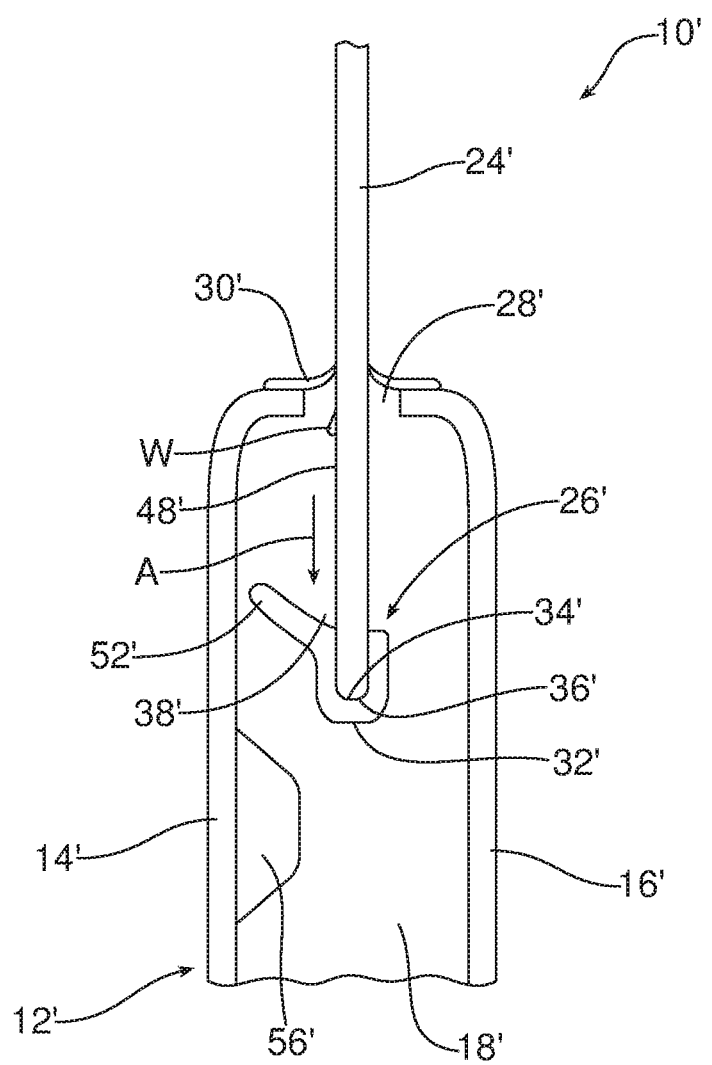
Figure 4B:
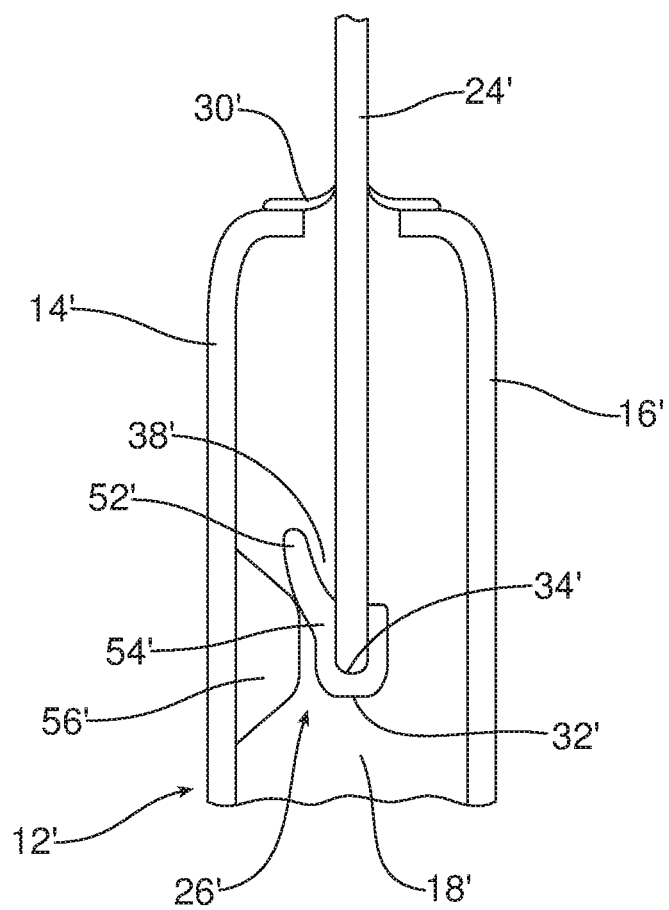

FIGS. 4a and 4b are schematic views illustrating an alternative embodiment of water management feature incorporating a flange, that forms at least a portion of a water drain channel and has a living hinge at its base. FIG. 4a illustrates the flange in its normal or rest position. FIG. 4b illustrates how the living hinge at the base of the flange allows the flange to be displaced so that the water drain channel will flex around and accommodate a component, structure, or obstruction within the internal cavity of the door and extending into the path of the flange as the window body is displaced between (a) the raised and closed position and (b) the lowered and opened position.

Reference will now be made in detail to the present preferred embodiments of the motor vehicle door assembly, examples of which are illustrated in the accompanying drawing figures.

DETAILED DESCRIPTION

Figure 1:
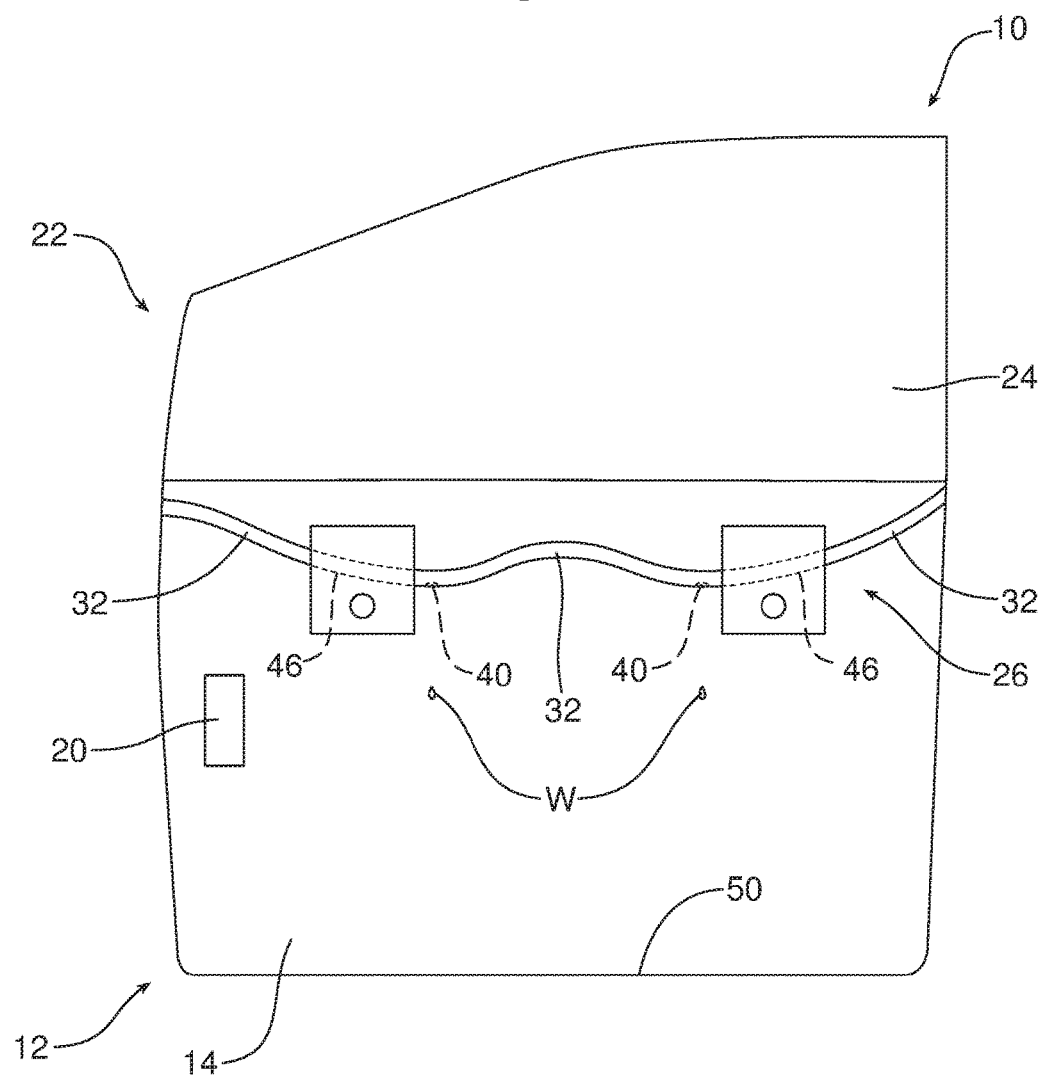
FIG. 1 is a schematic side elevational view of a motor vehicle door assembly including a door having an internal compartment, a door latch mechanism within that internal compartment and a window subassembly including a window body and a water management feature carried on the window body.

Reference is now made to FIGS. 1 and 4a which generally illustrate the motor vehicle door assembly 10. That motor vehicle door assembly 10 includes a door 12 including a door outer panel 14 and a door inner panel 16. An internal compartment 18 is provided between the door outer panel 14 and door inner panel 16. A door latch mechanism, schematically illustrated at 20, is provided within the internal compartment 18.

The motor vehicle door assembly 10 also includes a side door glass mechanism or window subassembly 22. That window subassembly 22 includes a window body 24 and a water management feature, generally designated by reference numeral 26, that is carried on the window body. As will be explained in greater detail below, the water management feature 26 functions to divert water from the door latch mechanism 20. That water enters the door 12 by passing through the window slot 28 provided at the top of the door for the passage of the window body 24 so that the window body may be displaced between (a) the raised and closed position and (b) the lowered and opened position. The seals 30 provided on the door outer panel 14 and door inner panel 16 at the window slot 28 engage the opposed faces of the window body 24 but do not completely seal water from the internal compartment 18 of the door 12.

Figure 2:
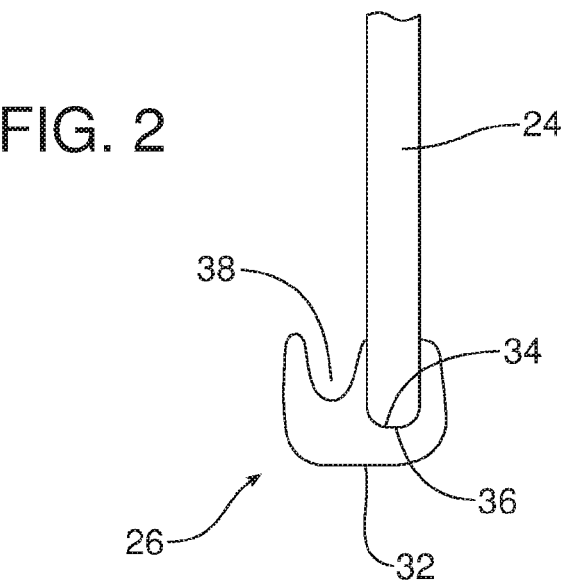
FIG. 2 is a detailed cross-sectional view along line 2-2 of FIG. 1 illustrating one possible embodiment of a water drain channel.

As best illustrated in FIGS. 1 and 2, the water management feature 26 may comprise one or more elongated strips 32 of resilient waterproof material such as plastic or rubber.

In the illustrated embodiment, the elongated strip 32 includes a receiver 34 for engaging the bottom edge 36 of the window body 24 and securing the water management feature 26 to the window. In addition, the elongated strip 32 includes a water drain channel 38 having at least one water drain hole 40.

Figure 3:
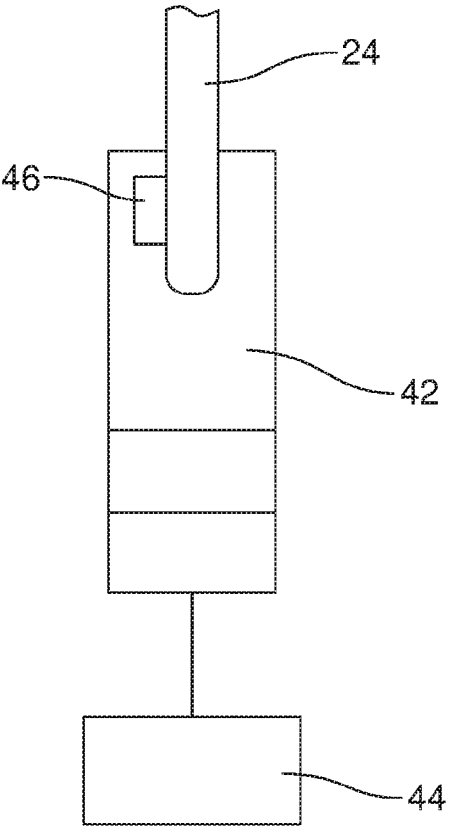
FIG. 3 is a cross sectional view along line 3-3 of FIG. 1 illustrating one possible embodiment of a window bracket incorporating a water passageway for the passage of water.

As best illustrated in FIGS. 1 and 3, the window subassembly 22 also includes a window bracket 42 that connects the window body 24 to a window regulator 44 of a type known in the art for displacing the window body between (a) the raised and closed position and (b) the lowered and opened position.

As illustrated in FIGS. 1 and 3, the window bracket 42 includes a water passageway 46 extending completely across the width of the window bracket. That water passageway 46 is provided in communication with the water drain channel 38. As should be appreciated from reviewing FIG. 4a, any water W penetrating the seals 30 flows down the outer face 48 of the window body 24 under the force of gravity (note action arrow A). That water W is collected in the water drain channel 38 which is inclined toward one of the water drain holes 40 that are remote from the door latch mechanism 20. Accordingly, the water management feature 26 effectively functions to divert water around the door latch mechanism 20, protecting it from the water W and potential freezing in inclement winter weather conditions. The water W that drips from the one or more water drain holes 40 is collected at the bottom 50 of the door 12 and expelled through a drain hole (not shown) in the door 12 in a manner known in the art.

Reference is now made to FIGS. 4a and 4b illustrating one possible embodiment of the water management feature 26'. In this embodiment, the water management feature 26' includes the receiver 34' that allows the connection of the water management feature to the bottom edge 36' of the window body 24'. A flange 52' extends from the receiver and forms the water drain channel 38'. As illustrated, a living hinge 54' is provided at the base of the flange 52' where the flange connects with the receiver 34'. The function of the living hinge 54' will be appreciated from reviewing FIGS. 4a and 4b.

More specifically, FIG. 4a illustrates the flange 52' in its normal or rest position wherein it forms an open water drain channel 38' for collecting water.

In the illustrated embodiment, the motor vehicle door assembly 10' includes a component 56' extending into the path of the water management feature 26' so that the water management feature 26' engages the component 56' when the window body 24' is raised or lowered (note FIG. 4b). As illustrated in FIG. 4b, when the water management feature 26' comes into engagement with the obstruction or component 56', the flange 52' folds or bends along the living hinge 54' and, accordingly, the water drain channel 38' flexes around the component without interfering with the raising or lowering of the window body 24'. Once the flange 52' has passed the component 56', the resilient memory of the flange 52' and the living hinge 54' causes the flange to return to the normal or home position illustrated in FIG. 4a thereby restoring a fully open water drain channel 38' along that section of the water management feature 26' that engages the component 56'.

Consistent with the above description, a method is provided of diverting water from a door latch mechanism 20 in a motor vehicle door assembly 10. That method comprises the steps of collecting water in a water management feature 26 carried on a window body 24 in the motor vehicle door 12 and draining that water from the water management feature at a location remote from the door latch mechanism 20. The method may further include the step of directing the water along a water drain channel 38 at a bottom edge 36 of the window body 24 to a water drain hole 40.

In addition the method may include the step of directing the water through a water passageway 46 in a window bracket 42 wherein that water passageway is in communication with the water drain channel 38.

In some embodiments, the method may also include the step of forming the water drain channel 38' from a flange 52' having a living hinge 54' whereby the water drain channel will flex around an obstruction or component 56' in the path of the water management feature 26' as the window body 24' is displaced between (a) the raised and closed position and (b) the lowered and opened position.

The foregoing has been presented for purposes of illustration and description. It is not intended to be exhaustive or to limit the embodiments to the precise form disclosed. Obvious modifications and variations are possible in light of the above teachings. For example, while the illustrated embodiment shows and describes how the water management feature 26 protects the door latch mechanism 20 from water, it should also be appreciated that the water management feature may also protect the window regulator, motors, electronics module or other electronics in the same manner. All such modifications and variations are within the scope of the appended claims when interpreted in accordance with the breadth to which they are fairly, legally and equitably entitled.

What is claimed:

1. A motor vehicle door assembly, comprising:
a door having an internal compartment;
a door latch mechanism within said internal compartment; and
a window subassembly including (a) a window body, (b) a water management feature carried on said window body, said water management feature having an elongated strip including a water drain channel and at least one water drain hole in said water drain channel whereby water is diverted from said door latch mechanism and (c) a window bracket connecting said window body to a window regulator whereby said window body is displaced between (1) a raised and closed position and (2) a lowered and opened position, said window bracket including a water passageway in communication with said water drain channel whereby said water flows along said water drain channel through said water passageway toward said at least one water drain hole.

2. The motor vehicle door assembly of claim 1, wherein said elongated strip extends along a bottom edge of said window body.

3. The motor vehicle door assembly of claim 2, wherein said elongated strip includes a flange forming at least a portion of said water drain channel.

4. The motor vehicle door assembly of claim 3, wherein said elongated strip includes a receiver engaging and holding said bottom edge of said window body.

5. The motor vehicle door assembly of claim 4, wherein said flange extends from said receiver.

6. The motor vehicle door assembly of claim 5, further including a living hinge at a base of said flange.

* * * * *